March 16, 1965  J. W. BREAKFIELD, SR  3,173,991
ELECTRICAL CABLE WITH PERFORATED SEPARATOR STRIP
Filed April 17, 1962
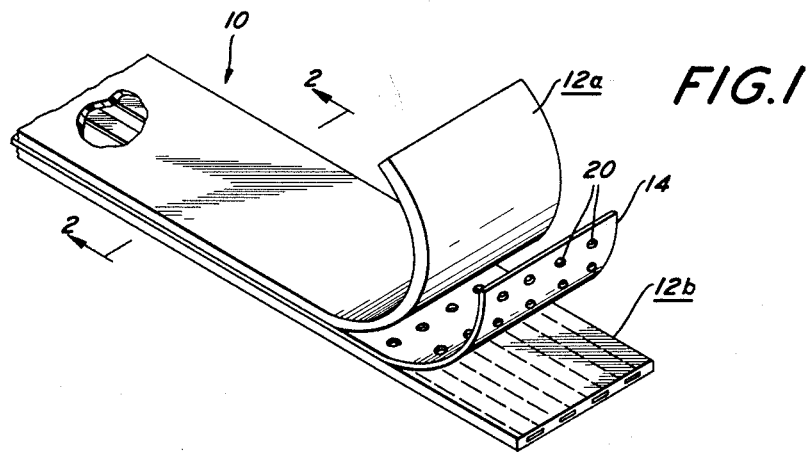
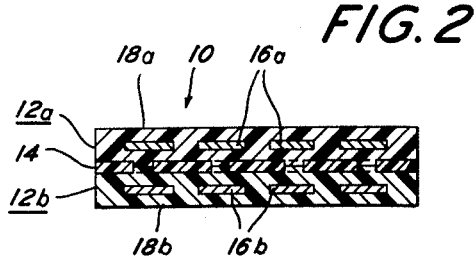
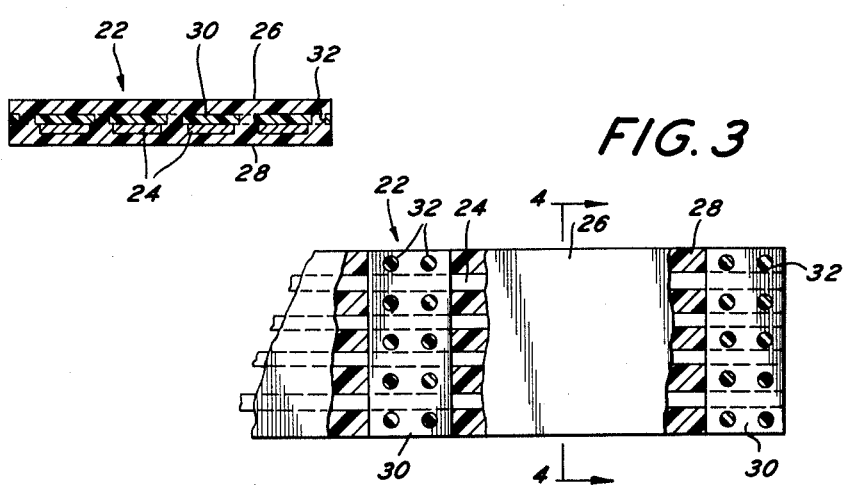
INVENTOR.
JOSEPH W. BREAKFIELD, SR.
BY
Donald S. Cohen
ATTORNEY United States Patent Office 3,173,991
Patented Mar. 16, 1965

3,173,991
ELECTRICAL CABLE WITH PERFORATED
SEPARATOR STRIP
Joseph W. Breakfield, Sr., Philadelphia, Pa., assignor to International Resistance Company, Philadelphia, Pa.
Filed Apr. 17, 1962, Ser. No. 188,089
8 Claims. (Cl. 174—117)

The present invention relates to an electrical cable, and more particularly to an electrical cable which provides for ease of stripping the insulation from the conductors. Also, the present invention relates to a flat, multi-layer electrical cable which provides for ease of stripping the layers of the cable apart.

Recently there has come into commercial use a flat, multi-conductor electrical cable. Such a cable comprises a plurality of electrical conductors or wires bonded between two flat layers of an electrical insulating plastic with the conductors being arranged in spaced, parallel relation. Where an electrical cable is required which contains more conductors than can be placed in a single width of a single layer, a plurality of the single layers are bonded together in stacked relation to provide a multi-layer cable.

A problem with such flat, multi-conductor cables is that it is necessary to expose the ends of the conductors, and sometimes portions of the conductors between the ends of the cable to permit making electrical connections to the conductors. Presently this is achieved by stripping away portions of the insulation by means of various types of buffing, scraping or cutting tools or machines. However, such stripping of the insulation from the conductors is sometimes required where a stripping tool or machine is not readily available. With regard to such multi-layer cables, it is often desired to completely or partially remove one or more of the layers from the remaining layers. This may be required where the cable contains more layers than actually required, or where a portion of one or more of the layers must be twisted or bent to extend in a different direction from the other layers. Since the layers are bonded together by the insulation material, the removal of a layer or a portion of a layer is quite difficult.

It is an object of the present invention to provide a novel electrical cable.

It is another object of the present invention to provide a novel flat, multi-conductor electrical cable.

It is still another object of the present invention to provide a flat, multi-conductor cable in which the insulation or parts of the insulation can be easily and quickly stripped from the conductors.

It is a further object of the present invention to provide a novel multi-layer, flat, multi-conductor cable.

It is a still further object of the present invention to provide a multi-layer, flat, multi-conductor cable in which the layers can be easily and quickly separated.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view, partially broken away, of a multi-layer cable of the present invention.

FIGURE 2 is a sectional view taken along line 2—2 of FIGURE 1.

FIGURE 3 is a top elevational view, partially broken away, of a flat, multi-conductor cable of the present invention.

FIGURE 4 is a sectional view taken along line 4—4 of FIGURE 3.

In general, the present invention relates to a flat, multi-conductor cable having means for permitting two adjacent layers of the insulating material, which are bonded together, to be easily and quickly separated without the need for any special tools. Such separating means comprises a flat separator layer or strip having a plurality of holes therethrough, and which is sandwiched between the two layers of the insulation. The separator layer or strip is of a material which does not readily adhere to the material of the insulation layers or to the means for bonding the insulation layers together. The insulation layers are bonded together through the holes in the separator layer or strip. The holes in the separator layer or strip are of such density and size to provide a bond between the insulation layers which cannot be broken during normal handling of the cable. However, upon manually pulling the insulation layers apart, the individual, small bonds between the insulation layers through the holes in the separator layer or strip can be easily and quickly broken without damage to the insulation layers.

Referring to FIGURES 1 and 2, a multi-layer electrical cable of the present invention is generally designated as 10. Multi-layer cable 10 comprises two single layer, multi-conductor cables 12a and 12b, and a separator layer 14.

The single layer, multi-conductor cable 12a comprises a plurality of conductors 16a of an electrically conductive metal arranged in spaced, parallel relation, and encased in an electrically insulating material 18a, such as a plastic. The conductors 16a may be encased in the insulating material 18a by sandwiching the conductors between two layers of the insulating material, and bonding the two layers of the insulating material together either by fusion through the application of heat and pressure, or by means of a suitable cement. The single layer, multi-conductor cable 12b likewise comprises a plurality of conductors 16b arranged in spaced, parallel relation, and encased in an insulating material 18b, such as a plastic.

Separator layer 14 comprises a thin layer of a suitable material having a plurality of holes 20 therethrough. Separator layer 14 is of a material which will not readily adhere to the insulation material 18a and 18b of the single layer, multi-conductor cables 12a and 12b, or to the means used for bonding the cables 12a and 12b together. The separator layer 14 is preferably of a material different from that of the insulation materials 18a and 18b. For example, the insulation materials 18a and 18b may be either polyethylene, polyvinyl chloride, or polytrifluorochloroethylene, and the separator layer 14 may be made of either Mylar, polytrifluorochloroethylene, or polytetrafluoroethylene. However, it should be understood that these are only a few of the materials which can be used for the insulation materials 18a and 18b and the separator layer 14, and that there are many other well known materials which can be used for the insulation materials 18a and 18b and the separator layer 14.

The separator layer 14 is sandwiched between the single layer cables 12a and 12b, and the insulation materials 18a and 18b are bonded together through the holes 20 in the separator layer 14. The single layer cables 12a and 12b may be bonded together by the application of heat and pressure to fuse the insulation materials 18a and 18b together through the holes 20 in the separator layer 14, or by means of a suitable cement which extends through the holes 20 in the separator layer. The bond between the single layer cables 12a and 12b is sufficient to prevent separation of the single layer cables during normal handling of the cable 10. However, since the single layer cables 12a and 12b are bonded together only along small areas, the single layer cables can be easily and quickly pulled apart manually without the need of any special tools, and without damaging either of the single layer cables. Although the multi-layer cable 10 of the present invention is shown as comprising only two layers, the cable 10 can comprise any desired number of layers with a separator layer 14 being sandwiched between each pair of adjacent layers.

Referring to FIGURES 3 and 4, a flat, multi-conductor cable of the present invention is generally designated as 22. Cable 22 comprises a plurality of conductors 24 of an electrically conductive metal arranged in spaced, parallel relation. The conductors 24 are sandwiched between two layers 26 and 28 of an electrical insulation material, such as a plastic. A plurality of separator strips 30 are provided between the conductors 24 and the insulation layer 26 at spaced points along the cable 22. Separator strips 30 extend the full width of the cable 22, and are provided with a plurality of holes 32 therethrough. The holes 32 in the separator strips 30 are positioned over the spaces between the conductors 24. The separator strips 30 are made of a material which will not readily adhere to the material of the insulation layers 26 and 28, or the means for bonding the insulation layers together, and are preferably of a material different from that of the insulation layers. The insulation layers 26 and 28 are bonded together between and around the conductors 24, and at the separator strips 30 through the holes 32 in the separator strips. The insulation layers 26 and 28 may be bonded together by the application of heat and pressure to fuse the insulation layers together, or by a suitable cement.

With the cable 22 of the present invention, portions of the conductors 24 can be easily and quickly exposed by merely manually pulling apart the portions of the insulation layers 26 and 28 over the separator strips 30. At the separator strips 30 which are between the ends of the cable 22, the insulation layer 26 can be first cut along the end of the separator strip, and the portion of the insulation layer 26 over the separator strip then pulled from the cable. Although the cable 22 of the present invention is shown as having individual separator strips 30 at spaced intervals along its length, the cable 22 may be provided with a single separator strip which extends along the entire length of the cable.

The present invention may be embodied in other specific forms without departing from the spirit or essential attributes thereof and, accordingly, reference should be made to the appended claims, rather than to the foregoing specification as indicating the scope of the invention.

I claim:

1. An electrical cable comprising a plurality of elongated conductors of an electrically conductive metal, a pair of layers of an electrical insulation material, and a separator strip between said insulation layers, said separator strip having a plurality of holes therethrough and being of a material which does not readily adhere to the material of the insulation layers, said insulation layers being bonded together through the holes in the separator strip.

2. A multi-layer electrical cable comprising a pair of multi-conductor cables, each of said multi-conductor cables being encased in an electrical insulation material, and a separator strip between said multi-conductor cables, said separator strip having a plurality of holes therethrough and being of a material which does not readily adhere to the insulation material of the multi-conductor cables, the insulation material of the multi-conductor cables being bonded together through the holes in the separator strip.

3. A multi-layer cable in accordance with claim 2 in which each of the multi-conductor cables is flat, and includes a plurality of conductors of an electrically conductive metal arranged in spaced parallel relation, and the insulation material encases each of the conductors.

4. A multi-layer cable in accordance with claim 2 in which the separator layer extends across the entire width of the cable and along the entire length of the cable.

5. An electrical cable comprising a plurality of elongated conductors of an electrically conductive metal arranged in spaced parallel relation, a separate layer of an electrical insulation material extending along opposite sides of the conductors, said insulation layers sandwiching the conductors therebetween, and a separator strip between the conductors and one of the insulation layers, said separator strip having a plurality of holes therethrough and being of a material which does not readily adhere to the material of the insulation layers, said insulation layers being bonded together between the conductors and through the holes in the separator strip.

6. An electrical cable in accordance with claim 5 in which the holes in the separator strip are positioned between the conductors.

7. An electrical cable in accordance with claim 6 in which the separator strip extends the full width of the cable.

8. An electrical cable in accordance with claim 7 including a plurality of the separator strips arranged at spaced intervals along the cable.

References Cited by the Examiner

UNITED STATES PATENTS 2,736,677  2/56  Eisler _____ 174—68.5
3,057,952  10/62  Gordon _____ 174—117

FOREIGN PATENTS 920,487  1/47  France.

LARAMIE E. ASKIN, *Acting Primary Examiner.*
JOHN P. WILDMAN, *Examiner.*